United States Patent
Hermann

(10) Patent No.: US 8,935,052 B2
(45) Date of Patent: Jan. 13, 2015

(54) METHOD FOR CONTROLLING A DOOR OF A VEHICLE

(75) Inventor: Stefan Hermann, Köfering (DE)

(73) Assignee: Continental Automotive GmbH, Hannover (DE)

( * ) Notice: Subject to any disclaimer, the term of this patent is extended or adjusted under 35 U.S.C. 154(b) by 673 days.

(21) Appl. No.: 13/034,881

(22) Filed: Feb. 25, 2011

(65) Prior Publication Data

US 2011/0218709 A1 Sep. 8, 2011

(30) Foreign Application Priority Data

Mar. 3, 2010 (DE) .......................... 10 2010 010 057

(51) Int. Cl.
| | |
|---|---|
| B60R 25/00 | (2013.01) |
| B60R 25/20 | (2013.01) |
| B60R 25/24 | (2013.01) |
| G07C 9/00 | (2006.01) |
| E05F 15/20 | (2006.01) |

(52) U.S. Cl.
CPC ................. B60R 25/20 (2013.01); B60R 25/24 (2013.01); G07C 9/00309 (2013.01); *E05F 15/2046* (2013.01); *E05Y 2900/531* (2013.01); *G07C 2209/63* (2013.01)
USPC ............... 701/45; 701/36; 701/302; 702/127; 702/142; 702/149; 702/150

(58) Field of Classification Search
None
See application file for complete search history.

(56) References Cited

U.S. PATENT DOCUMENTS

| | | | | |
|---|---|---|---|---|
| 4,763,121 | A * | 8/1988 | Tomoda et al. | 340/5.61 |
| 5,751,073 | A * | 5/1998 | Ross | 307/10.5 |
| 5,929,769 | A * | 7/1999 | Garnault | 340/5.61 |
| 5,973,611 | A * | 10/1999 | Kulha et al. | 340/5.62 |
| 6,034,617 | A * | 3/2000 | Luebke et al. | 340/5.62 |
| 6,087,987 | A * | 7/2000 | Bachhuber et al. | 342/457 |
| 6,208,239 | B1 * | 3/2001 | Muller et al. | 340/426.35 |
| 6,218,932 | B1 * | 4/2001 | Stippler | 340/426.16 |
| 6,236,333 | B1 * | 5/2001 | King | 340/5.61 |

(Continued)

FOREIGN PATENT DOCUMENTS

| | | | | |
|---|---|---|---|---|
| CN | 1866788 A | 11/2006 | | B60R 25/00 |
| DE | 10106400 A1 | 8/2002 | | G07C 9/00 |
| JP | 2006283507 A | 10/2006 | | E05B 49/00 |

OTHER PUBLICATIONS

Chinese Office Action, Application No. 201110050858.5, 15 pages, Jul. 2, 2014.

*Primary Examiner* — Jonathan M Dager
(74) *Attorney, Agent, or Firm* — King & Spalding L.L.P.

(57) ABSTRACT

In a method for controlling at least one door of a vehicle, a movement of a mobile identification signal generator, assigned to the vehicle, relative to the vehicle is sensed as a function of time. A future position of the mobile identification signal generator is estimated at a future time based on the position, the speed of movement and the direction of movement of the mobile identification signal generator at the current time, and furthermore an unlocking condition is detected if the future position of the mobile identification signal generator is within a predetermined range. Finally, the at least one door is unlocked and/or opened based on the unlocking condition. As a result of the estimation of the position of an identification signal generator with respect to a next position measuring point, the reaction time and the susceptibility to faults of an access arrangement can be improved.

15 Claims, 2 Drawing Sheets

(56) References Cited

U.S. PATENT DOCUMENTS

| | | | |
|---|---|---|---|
| 6,359,348 B1* | 3/2002 | King | 307/10.1 |
| 6,396,412 B1* | 5/2002 | Banas | 340/5.2 |
| 6,437,683 B1* | 8/2002 | Wolf et al. | 340/5.61 |
| 6,552,649 B1* | 4/2003 | Okada et al. | 340/5.61 |
| 6,570,486 B1* | 5/2003 | Simon et al. | 340/5.1 |
| 6,583,715 B1* | 6/2003 | Benzie et al. | 340/5.64 |
| 6,606,492 B1* | 8/2003 | Losey | 455/411 |
| 6,617,961 B1* | 9/2003 | Janssen et al. | 340/5.8 |
| 6,670,883 B1* | 12/2003 | Asakura et al. | 340/5.61 |
| 6,700,475 B1* | 3/2004 | Geber et al. | 340/5.61 |
| 6,718,240 B1* | 4/2004 | Suda et al. | 701/36 |
| 6,803,851 B1* | 10/2004 | Kramer et al. | 340/5.61 |
| 6,803,882 B2* | 10/2004 | Hoetzel | 343/713 |
| 6,937,136 B2* | 8/2005 | Greenwood et al. | 340/5.61 |
| 6,963,268 B2* | 11/2005 | Brillon | 340/5.72 |
| 6,965,296 B2* | 11/2005 | Kamlah | 340/5.72 |
| 6,998,958 B2* | 2/2006 | Asakura et al. | 340/5.61 |
| 7,071,817 B2* | 7/2006 | Haselsteiner et al. | 340/426.28 |
| 7,190,253 B2* | 3/2007 | Shimomura | 340/5.3 |
| 7,292,134 B2* | 11/2007 | Conner et al. | 340/5.64 |
| 7,301,442 B2* | 11/2007 | Kolpasky et al. | 340/426.13 |
| 7,388,466 B2* | 6/2008 | Ghabra et al. | 340/5.61 |
| 7,397,344 B2* | 7/2008 | Nantz et al. | 340/5.72 |
| 7,850,078 B2* | 12/2010 | Christenson et al. | 235/382 |
| 7,916,021 B2* | 3/2011 | Lickfelt et al. | 340/571 |
| 7,944,340 B1* | 5/2011 | Ghabra et al. | 340/12.22 |
| 7,978,049 B2* | 7/2011 | Leitch | 340/5.72 |
| 8,009,023 B2* | 8/2011 | Bergerhoff et al. | 340/426.22 |
| 8,022,808 B2* | 9/2011 | Kurpinski et al. | 340/5.61 |
| 8,120,474 B2* | 2/2012 | Fujioka et al. | 340/426.36 |
| 8,149,083 B2* | 4/2012 | Suzuki et al. | 340/3.1 |
| 8,203,424 B2* | 6/2012 | Ghabra et al. | 340/5.6 |
| 8,222,992 B2* | 7/2012 | Nishiguchi et al. | 340/5.63 |
| 8,335,599 B2* | 12/2012 | Dickerhoof et al. | 701/2 |
| 8,344,850 B2* | 1/2013 | Girard et al. | 340/5.72 |
| 8,427,276 B2* | 4/2013 | McBride et al. | 340/5.64 |
| 8,531,268 B2* | 9/2013 | Ghabra et al. | 340/5.61 |
| 2001/0038328 A1* | 11/2001 | King et al. | 340/5.64 |
| 2002/0027498 A1* | 3/2002 | Stephane | 340/425.5 |
| 2003/0016140 A1* | 1/2003 | Bernard Brillon et al. | 340/825.72 |
| 2003/0090365 A1* | 5/2003 | Bergerhoff | 340/5.61 |
| 2003/0193388 A1* | 10/2003 | Ghabra et al. | 340/5.61 |
| 2003/0216124 A1* | 11/2003 | Emmerling et al. | 455/73 |
| 2004/0090308 A1* | 5/2004 | Takahashi et al. | 340/5.72 |
| 2004/0140883 A1* | 7/2004 | Jalil et al. | 340/5.64 |
| 2004/0178962 A1* | 9/2004 | Brillon | 343/713 |
| 2004/0201277 A1* | 10/2004 | Hentsch et al. | 307/10.1 |
| 2004/0205189 A1* | 10/2004 | Sata et al. | 709/225 |
| 2005/0168322 A1* | 8/2005 | Appenrodt et al. | 340/5.72 |
| 2005/0285724 A1* | 12/2005 | Schmidt et al. | 340/426.16 |
| 2006/0094350 A1* | 5/2006 | Ishimura et al. | 455/9 |
| 2006/0114100 A1* | 6/2006 | Ghabra et al. | 340/5.61 |
| 2006/0145809 A1* | 7/2006 | Crowhurst | 340/5.62 |
| 2006/0214768 A1* | 9/2006 | Hermann | 340/5.61 |
| 2006/0273887 A1 | 12/2006 | Yamamoto | 340/426.36 |
| 2007/0024416 A1* | 2/2007 | Tang et al. | 340/5.61 |
| 2007/0085656 A1* | 4/2007 | Tang et al. | 340/5.61 |
| 2007/0085658 A1* | 4/2007 | King et al. | 340/5.72 |
| 2007/0160206 A1* | 7/2007 | Ostrander et al. | 380/203 |
| 2007/0164876 A1* | 7/2007 | Ostrander et al. | 340/825.72 |
| 2007/0200672 A1* | 8/2007 | McBride et al. | 340/5.72 |
| 2007/0216517 A1* | 9/2007 | Kurpinski et al. | 340/5.72 |
| 2007/0296562 A1* | 12/2007 | Ghabra | 340/426.36 |
| 2008/0061931 A1* | 3/2008 | Hermann | 340/5.72 |
| 2008/0107266 A1* | 5/2008 | Kachouh et al. | 380/258 |
| 2008/0109123 A1* | 5/2008 | Kachouh et al. | 701/2 |
| 2008/0186132 A1* | 8/2008 | Ikeo | 340/5.7 |
| 2008/0258870 A1* | 10/2008 | Sugiura | 340/7.23 |
| 2010/0188248 A1* | 7/2010 | Sultan et al. | 340/825 |
| 2010/0236770 A1* | 9/2010 | Pursifull | 165/202 |
| 2010/0305779 A1* | 12/2010 | Hassan et al. | 701/2 |
| 2011/0022256 A1* | 1/2011 | Asada et al. | 701/22 |

* cited by examiner

METHOD FOR CONTROLLING A DOOR OF A VEHICLE

CROSS-REFERENCE TO RELATED APPLICATIONS

This application claims priority to DE Patent Application No. 10 2010 010 057.9 filed Mar. 3, 2010. The contents of which is incorporated herein by reference in its entirety.

TECHNICAL FIELD

The present invention relates to a method for controlling at least one door of a vehicle, and to an access arrangement for a vehicle, in particular for controlling the at least one door of the vehicle. In addition, the invention relates to a vehicle having the access arrangement mentioned above.

BACKGROUND

In order to prevent unauthorized access to a vehicle, in particular a motor vehicle, modern access authorization systems or access arrangements in vehicles use electronic security systems in which data communication takes place between a first communication device of the vehicle and a second communication device in a mobile identification signal generator of the user, such as a key or a key fob, in order to authenticate a user. In this context, in an active access arrangement, control signals and an identification code are transmitted from the mobile identification signal generator to the vehicle as a result, for example, by the user of the mobile identification signal generator pressing a corresponding pushbutton key, after which the vehicle is unlocked or locked if the identification code is correct.

In what is referred to as a passive access arrangement, firstly interrogation signals with a specific field strength are emitted by a first communication device of the vehicle at regular time intervals in order to check whether a mobile identification signal generator is located in an approach range around the vehicle. When a mobile identification signal generator approaches the vehicle and can eventually receive the interrogation signals thereof, said identification signal generators will respond to the reception of an interrogation signal in order to initiate an authentication process or pre-authentication process. In this context, data telegrams are exchanged in which ultimately the mobile identification signal generator transmits its authentication code to the vehicle. Given successful checking of the authentication code, it is then possible for a user located directly at the vehicle to initiate unlocking of the corresponding vehicle door or of all the vehicle doors by activating a door handle. Since there is no need here for a user to actively activate a mechanical or electrical identification signal generator or key, this type of access authorization is also referred to as passive access authorization checking, and the corresponding access authorization systems are referred to as passive electronic access authorization systems.

It is considered disadvantageous in such a method for acquiring access to a vehicle that after the door handle has been activated the corresponding vehicle door or all the doors of the vehicle have to be unlocked. If the driver or the person activating this door handle is very pressed for time, the unlocking process may last too long for such a person, and this has a disadvantageous effect on the acceptance level of a passive access authorization system.

SUMMARY

According to various embodiments, a possible way of accessing a vehicle which provides greater convenience to a user can be created.

According to an embodiment, a method for controlling at least one door of a vehicle, may have the following steps: sensing of a movement of a mobile identification signal generator, assigned to the vehicle, relative to the vehicle as a function of time; estimation of a future position of the mobile identification signal generator at a future time on the basis of the position, the speed of movement and the direction of movement of the mobile identification signal generator at the current time; detection of an unlocking condition if the future position of the mobile identification signal generator is within a predetermined range; and unlocking and/or opening of the at least one door on the basis of the unlocking condition.

According to a further embodiment of the above method, an unlocking veto condition can be detected if the direction of movement of the mobile identification signal generator at the current time is not in the direction of the vehicle, with the result that when the unlocking veto condition applies, the at least one door is not unlocked and/or opened. According to a further embodiment of the above method, the unlocking veto condition may be rescinded if the identification signal generator is located within the predetermined range and its speed of movement is lower than a predetermined speed threshold value.

According to another embodiment, a method for controlling at least one door of a vehicle, may have the following steps:

sensing of a movement of a mobile identification signal generator, assigned to the vehicle, relative to the vehicle as a function of time; —estimation of a future position of the mobile identification signal generator at a future time on the basis of the position, the speed of movement and the direction of movement of the mobile identification signal generator at the current time; —detection of a locking condition if the future position of the mobile identification signal generator is outside a predetermined range; and —locking and/or closing of the at least one door on the basis of the locking condition.

According to a further embodiment of any of the above mentioned methods, authentication of the mobile identification signal generator can be carried out at the vehicle in order to check the association of the mobile identification signal generator with the vehicle. According to a further embodiment of any of the above mentioned methods, According to a further embodiment of any of the above mentioned methods, the position of the mobile identification signal generator can be measured at predetermined time intervals. According to a further embodiment of any of the above mentioned methods, the speed of movement of the mobile identification signal generator at the current time can be determined on the basis of the change in the position of the mobile identification signal generator at a preceding time with respect to the position of the mobile identification signal generator at the current time in the time interval from the preceding time to the current time, and the current direction of movement is determined as a direction from the position of the mobile identification signal generator at a preceding time with respect to the position of the mobile identification signal generator at the current time.

According to yet another embodiment, a method for unlocking a vehicle may have the following steps: —sensing of the position of a mobile identification signal generator relative to the vehicle; —determination of a speed of movement of the mobile identification signal generator relative to the vehicle; —unlocking of at least one door of the vehicle if the identification signal generator is located within a predetermined range and the speed of movement of the mobile identification signal generator relative to the vehicle within the predetermined range is lower than a predetermined speed threshold value.

According to yet another embodiment, an access arrangement for a vehicle may have the following features: —a vehicle-side movement sensing device for sensing a movement of a mobile identification signal generator, assigned to the vehicle, relative to the vehicle as a function of time; —an evaluation device for: + estimation of a future position of the mobile identification signal generator at a future time on the basis of the position, the speed of movement and the direction of movement of the mobile identification signal generator at the current time, + detection of an unlocking condition if the future position of the mobile identification signal generator is within a predetermined range, and + outputting of a signal for unlocking and/or opening at least one door on the basis of the unlocking condition.

According to a further embodiment of the above access arrangement, the evaluation device is also configured to detect an unlocking veto condition if the direction of movement at the current time is not in the direction of the vehicle, and not to output a signal if the unlocking veto condition applies.

According to yet another embodiment, an access arrangement for a vehicle may have the following features: —a vehicle-side movement sensing device for sensing a movement of a mobile identification signal generator, assigned to the vehicle, relative to the vehicle as a function of time; —an evaluation device for: + estimation of a future position of the mobile identification signal generator at a future time on the basis of the position, the speed of movement and the direction of movement of the mobile identification signal generator at the current time, + detection of a locking condition if the future position of the mobile identification signal generator is outside a predetermined range, and + outputting of a signal for locking and/or closing the at least one door on the basis of the locking condition.

According to a further embodiment of any of the above mentioned access arrangements, the movement sensing device may comprise a vehicle-side transceiver device which, in order to sense the movement of the mobile identification signal generator, may be configured: to emit a multiplicity of interrogation signals with a predetermined intensity at predetermined time intervals, and to receive a response signal, assigned to an interrogation signal, from the mobile identification signal generator, which respond signal contains information relating to the intensity of the interrogation signal which is measured at the location of the mobile identification signal generator.

According to a further embodiment of any of the above mentioned access arrangements, the access arrangement also may have a vehicle-side transceiver device for carrying out authentication with a mobile identification signal generator.

According to yet another embodiment, a vehicle may have an access arrangement as described above.

BRIEF DESCRIPTION OF THE DRAWINGS

In the text which follows, exemplary embodiments will now be explained in more detail with reference to the accompanying drawings, in which.

DETAILED DESCRIPTION

Figure 1:
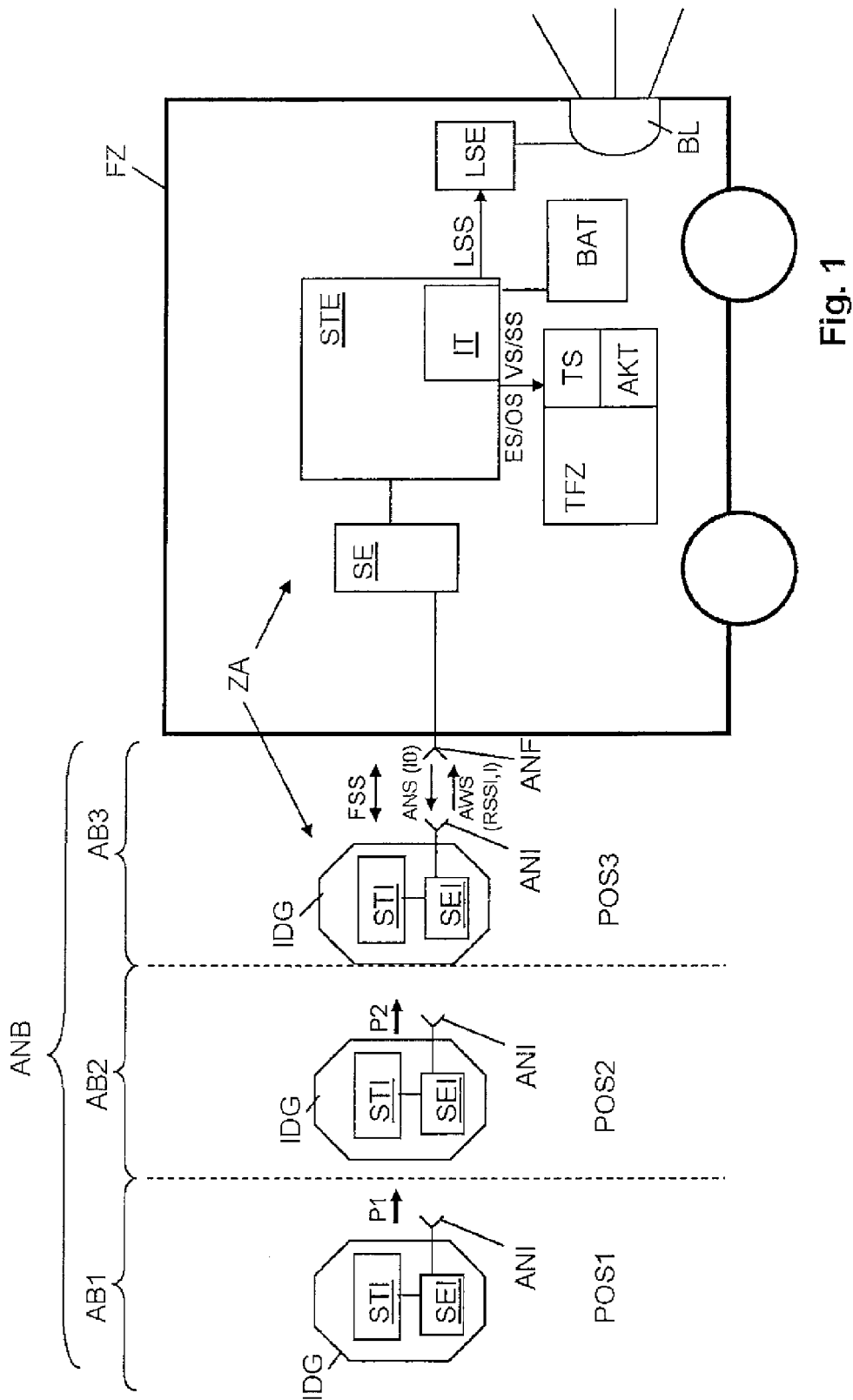
FIG. 1 shows a schematic illustration of a keyless electronic access authorization system or of an access arrangement in a vehicle according to one embodiment.

In this context, a method for controlling at least one door of a vehicle, in particular of a motor vehicle, according to a first aspect comprises the following steps. A movement of a mobile identification signal generator, assigned to the vehicle, relative to the vehicle is sensed as a function of time. In addition, a future position of the mobile identification signal generator is estimated (extrapolated) at a future time on the basis of the position, the speed of movement and the direction of movement of the mobile identification signal generator at the current time. Moreover, it is tested and/or detected whether an unlocking condition applies, i.e. to be precise whether the future position of the mobile identification signal generator is within a predetermined range (relative to the vehicle). The at least one door is then unlocked and/or opened on the basis of the unlocking condition. In other words, the fact that the unlocking condition applies is a precondition for the unlocking and/or opening of the at least one door. In this way it is possible to improve the reaction time, for example during the unlocking and/or opening of the at least one door, and the susceptibility to faults of the access process, by estimation of the future movement of the mobile identification signal generator. In particular, the convenience for operators and/or drivers which require rapid access to the vehicle is also enhanced by the estimation of the future movement of the mobile identification signal generator.

According to one refinement of the method regarding the first aspect, it is also conceivable that an unlocking veto condition is detected if the direction of movement of the mobile identification signal generator at the current time is not in the direction of the vehicle, with the result that when the unlocking veto condition applies, the at least one door is not unlocked and/or opened. This has the purpose that, for example, an operator or driver who enters the predetermined range (access range) in, for example, a direction of movement of approximately parallel to the vehicle and also continues to move essentially in a parallel direction, does not actually have the intention of entering the interior of the vehicle. Instead, a driver desires to enter the vehicle if his direction of movement is in the direction of the vehicle. It is therefore possible by means of this refinement to make a differentiation in the case of unlocking, specifically to the effect that unlocking occurs only if the driver actually has a desire to enter the vehicle, and it does not occur if he only wishes to pass the vehicle.

According to the description of the method in accordance with the first aspect, a driver (for example possibly forced by structural conditions in the vicinity of the vehicle) may approach the vehicle or the predetermined range (unlocking range), in which case the unlocking condition is met if a future position within the predetermined range is estimated. However, if it is detected that the direction of movement of the identification signal generator is not toward the vehicle but rather, for example parallel thereto, an unlocking veto condition is detected by means of which unlocking and/or opening of the at least door is inhibited. The identification signal generator may already be located within the predetermined range and may continue to move parallel to the vehicle. As mentioned above, a door would not be unlocked/opened since it is still not possible to detect any intention to enter the vehicle on the part of the person carrying the identification signal generator. However, if the speed of movement of the identification signal generator slows down, with the result that said speed of movement is lower within the predetermined range than a predetermined speed threshold value, this does in fact indicate an intention to enter the vehicle on the part of the person carrying the identification signal generator. It is therefore possible, on condition that the identification signal generator is located within the predetermined range and its speed of movement is lower than a predetermined speed threshold value, to rescind the unlocking veto condition and to carry out unlocking and/or opening of the at least one door.

According to a second aspect, a method for controlling at least one door of a vehicle is provided with which in particular the vehicle can be locked. In this context, the movement of a mobile identification signal generator, assigned to the vehicle, relative to the vehicle is firstly sensed as a function of time. In addition, a future position of the mobile identification signal generator is estimated (extrapolated) at a future time on the basis of the position, the speed of movement and the direction of movement of the mobile identification signal generator at the current time. Furthermore, the presence of a locking condition is detected if the future position of the mobile identification signal generator is outside a predetermined range (relative to the vehicle). In particular, the presence of the locking condition can be detected if the position of the mobile identification signal generator at the current time is still within the predetermined range, and the future position of the mobile identification signal generator is then outside the predetermined range. Finally, the at least one door is locked and/or closed on the basis of the locking condition. In this way, the convenience during locking can also be increased.

According to a refinement of this method according to the second aspect, the locking condition can be detected only if the speed of movement exceeds a predetermined second threshold value. In other words, the method assumes that the driver or operator carrying the mobile identification signal generator would actually like to move away from the vehicle only if the speed of movement reaches a predetermined high value. In this way the security of the method can be increased.

According to a refinement with respect to both aspects, authentication of the mobile identification signal generator is carried out at the vehicle in order to check the association of the mobile identification signal generator with the vehicle. Such authentication can be carried out, in particular, before the sensing of a movement of the mobile identification signal generator, for example if the mobile identification signal generator has approached the vehicle in such a way that two-way communication is possible with the vehicle. However, it is basically irrelevant whether authentication is firstly carried out with the mobile identification signal generator and subsequently a movement of the identification signal generator is sensed, or vice versa. The first case has the advantage here that a movement of an identification signal generator would have to be sensed only if said identification signal generator had been successfully authenticated, which would possibly allow a saving in terms of computing power.

According to a further refinement, the position of the mobile identification signal generator can be measured at predetermined time intervals, in particular at regular time intervals of, for example, 250 milliseconds (ms). It is also conceivable to shorten the time intervals as the distance between the mobile identification signal generator and the vehicle becomes smaller.

According to a further refinement, the speed of movement of the mobile identification signal generator at the current time is determined on the basis of the change in the position of the mobile identification signal generator at a preceding time with respect to the position of the mobile identification signal generator at the current time in the time interval from the preceding time to the current time. It is also possible to determine the current direction of movement as a direction from the position of the mobile identification signal generator at the preceding time with respect to the position of the mobile identification signal generator at the current time.

According to a third aspect, an access arrangement for a vehicle having the following features is provided. In this context, this access arrangement according to the third aspect is tailored to the method according to the first aspect. This access arrangement has a vehicle-side movement sensing device for sensing a movement of a mobile identification signal generator, assigned to the vehicle, relative to the vehicle as a function of time. Furthermore, said access arrangement has an evaluation device which is configured for estimation of a future position of the mobile identification signal generator at a future time on the basis of the position, the speed of movement and the direction of movement of the mobile identification signal generator at the current time; for detection of an unlocking condition if the future position of the mobile identification signal generator is within a predetermined range (relative to the vehicle); and for outputting of a signal for unlocking and/or opening the at least one door on the basis of the unlocking condition. In this way, the evaluation device is capable, at an earlier time, to discern or estimate the intention of a driver or operator carrying the mobile identification signal generator and to unlock or open the at least one door correspondingly with a short reaction time. Consequently, the convenience when accessing the vehicle is in turn increased.

According to a refinement, the evaluation device is also configured to detect an unlocking veto condition if the direction of movement at the current time is not in the direction of the vehicle, and correspondingly not to output a signal if the unlocking veto condition applies. It is therefore again possible to carry out differentiated unlocking/opening of the at least one door, specifically only if a driver is actually moving toward the vehicle and is not just going past the vehicle.

Finally, an access arrangement for a vehicle according to a fourth aspect having the following features is provided. In this context, this access arrangement according to the fourth aspect corresponds essentially to the teaching of the method according to the second aspect. Said access arrangement has a vehicle-side movement sensing device for sensing a movement of a mobile identification signal generator, assigned to the vehicle, relative to the vehicle as a function of time. In addition, said access arrangement has an evaluation device which is configured for estimation of a future position of the mobile identification signal generator at a future time on the basis of the position, the speed of movement and the direction of movement of the mobile identification signal generator at the current time; for detection of a locking condition if the future position of the mobile identification signal generator is outside a predetermined range (relative to the vehicle); and for outputting of a signal for locking and/or closing the at least one door on the basis of the locking condition. In particular, it is again possible here to detect that the locking condition applies if at the current time the position of the mobile identification signal generator is still within the predetermined range, and the future position of the mobile identification signal generator outside a predetermined range is only extrapolated at the future time. In this way, a gain in convenience can also be achieved when locking the vehicle.

According to one refinement of this fourth aspect, the evaluation device can output a signal only if the speed of movement of the mobile identification signal generator exceeds a predetermined second threshold value. This ensures that a driver or operator who is moving away from the vehicle at a specific, high speed of movement, actually has the intention of moving away from the vehicle.

According to one refinement of all two aspects which relate to the access arrangement, the movement sensing device has a vehicle-side transceiver device which, in order to sense the movement pattern, emits a multiplicity of interrogation signals with a predetermined intensity at predetermined time intervals, and receives a response signal, assigned to an interrogation signal, from the mobile identification signal generator, which respond signal contains information relating to the intensity of the interrogation signal which is measured at the location of the mobile identification signal generator. Alternatively, the movement sensing device can have an optical sensor, for example in the form of a camera, for observing or tracking the movement of the driver or operator assigned to the mobile identification signal generator.

According to a further refinement, the vehicle-side transceiver device can be configured for carrying out a function for the purpose of identification with the mobile identification signal generator, in addition to, or independently of, the function illustrated above.

According to a fifth aspect, a vehicle having an access arrangement according to one of the aspects three to four is provided.

Advantageous refinements of the methods mentioned above are, insofar as they can also be transferred to the corresponding access arrangements, also to be considered advantageous refinements of the access arrangements.

Reference will firstly be made to FIG. 1 in which an access authorization system or an access arrangement ZA, which is configured for use in a vehicle, here the motor vehicle FZ, is shown. The access arrangement ZA comprises here (in a vehicle-side area, cf. the right-hand side of FIG. 1) a vehicle-side control device STE which is supplied with current by a battery BAT. Although not illustrated, the battery BAT also supplies the further components of the vehicle with current. The control device STE is connected to a vehicle-side transceiver device SE which is capable of communicating with a mobile identification signal generator IDG (which will be explained in more detail later) via a radio link FSS by means of a vehicle-side antenna ANF. Furthermore, the control device STE is connected to a door lock TS (which may be, for example, part of a central locking system or may be, for example, representative thereof) in order to actuate the door lock by means of an unlocking signal ES or opening signal OS. The door lock is assigned here to a door TFZ of the vehicle in order to unlock or even open the door TFZ depending on the signal ES or OS received. In order to open the door, the access arrangement ZA has an actuating device or an actuator AKT, which comprises, for example, a spring element (which is in a prestressed state when the door is in a closed state and opens the door when unlocking occurs) or a motor, such as an electric motor, for automatically opening the door.

Furthermore, the control device STE is connected to a light control device LSE, wherein the light control device LSE is capable, after receiving a light control signal LSS, of activating or deactivating a lighting device BL, here for example in the form of a flashing indicator light or dipped headlight.

As has been described above, the vehicle FZ will communicate via the radio link FSS with a mobile identification signal generator (in an identification-signal-generator-side area, cf. the left-hand side of FIG. 1) IDG. The precondition for this is that the mobile identification signal generator IDG is in an approach range ANB in which the signals which are emitted by the vehicle-side antenna ANF (interrogation signals) still have a sufficient field strength to be received satisfactorily by the mobile identification signal generator IDG. For the reception of signals of the vehicle-side antenna ANF, a mobile identification signal generator IDG has an identification-signal-generator-side antenna ANI which is connected to an identification-signal-generator-side transceiver device SEI in order to process the received signals and/or generate new signals which can ultimately be emitted via the antenna ANI. An identification-signal-generator-side control device STI is connected to the identification-signal-generator-side transceiver device SEI and is, on the one hand, responsible for carrying out an authentication process with the vehicle FZ, but can also be used for determining an intensity or distance of the mobile identification signal generator IDG from the vehicle FZ (and therefore for determining a movement), as is explained in more detail below. As is also explained below (also with respect to FIG. 2), the mobile identification signal generator IDG in FIG. 1 is illustrated in three different positions POS1, POS2 and POS3.

In the first position POS1, the mobile identification signal generator is still located within the approach range ANB, specifically in the first zone AB1, and said mobile identification signal generator communicates with the vehicle FZ via the radio link FSS. If the mobile identification signal generator IDG moves with its user or driver along the arrow P1 toward the vehicle FZ, it will arrive at the second position POS2. To be more precise, the mobile identification signal generator IDG is located at the position POS2 in a second zone AB2 (characterized by the dashed lines between which the mobile identification signal generator IDG is located at the position POS2) which is at a certain distance from the vehicle. Finally, if the mobile identification signal generator IDG continues to move along the arrow P2 toward the vehicle, it will arrive at a third approach zone AB3 which is located directly around the vehicle FZ.

Figures 2, 3, 4:
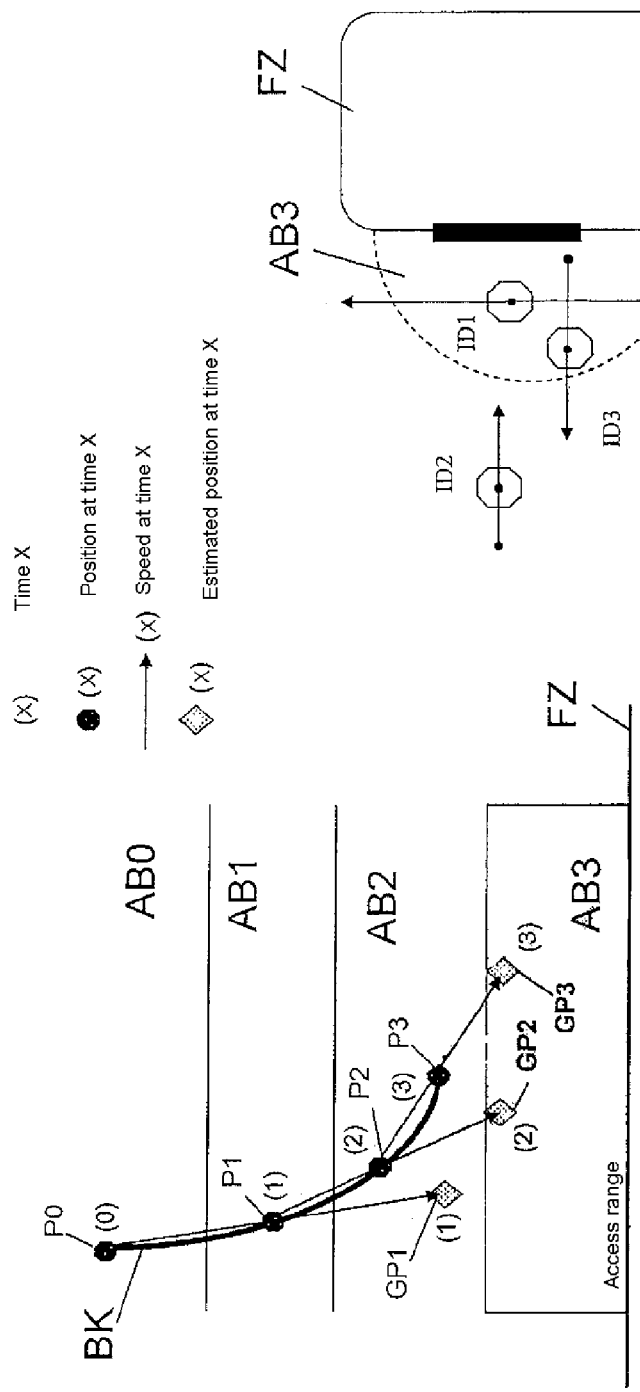
FIG. 2 shows a schematic illustration of the process of a mobile identification signal generator approaching a vehicle, which process leads to corresponding unlocking of the vehicle.
FIG. 3 in turn shows a schematic illustration of the process of a mobile identification signal generator approaching a vehicle, during which process the vehicle is not unlocked.
FIG. 4 shows a schematic illustration clarifying possible unlocking and locking strategies as a function of the direction of movement of a mobile identification signal generator (which is carried along by the driver or operator).

Reference is now made to FIG. 2 in which (also partially with reference to FIG. 1) a sequence of the operation of the access arrangement ZA for unlocking or opening of the vehicle door TFZ is shown. If a motor vehicle, such as the motor vehicle FZ, is in a deactivated or parked state, according to a first step said motor vehicle FZ will emit interrogation signals ANS of a specific field strength I0 at regular intervals or at specific times. Mobile identification signal generators, such as the identification signal generator IDG, can then satisfactorily sense these signals if, in particular, they are located within the approach range ANB illustrated in FIG. 1. However, it is also conceivable that identification signal generators which are located in the vicinity (and still not within) of the approach range can already communicate with the vehicle. For example, identification signal generators which are located in the range or in the approach zone AB0 shown in FIG. 2 can already communicate with the vehicle. As is explained more precisely below, an identification signal generator which has received an interrogation signal ANS transmits back in the direction of the vehicle a response signal with the intensity which is measured at the location of the identification signal generator. The control device or evaluation device STE can determine therefrom the position of the identification signal generator and consequently also the movement thereof as a function of time.

Starting from this position P0 at the time (0), the mobile identification signal generator moves toward the vehicle in accordance with the movement curve BK, and according to a second step enters the first zone AB1 of the approach range ANB. Here, at the time (1) (after a predetermined time interval has passed), the position P1 of the identification signal generator (corresponding to the position POS1 in FIG. 1) is measured in turn, wherein the instantaneous speed at the position P0 of the identification signal generator can be determined on the basis of the distance traveled between the position P1 and the position P0 in relation to the time interval between the two measurements at the positions P1 and P0. Accordingly, a direction of movement of the mobile identification signal generator at the position P1 can be determined on the basis of a straight line through the two positions P0 and P1 in the direction of the position P1. On the basis of the speed of movement and the direction of movement of the mobile identification signal generator present at the time (1), the anticipated estimated position of said identification signal generator at the next time of position measurement can be estimated (this is characterized in figure by the rhombus characterized by GP1). As is shown in FIG. 2, this position (1) which is estimated at the time 1 would not yet be in the access range AB3, with the result that at the time (1) an unlocking condition for the control device or evaluation device STE of the vehicle does not yet apply.

If, according to a third step, the mobile identification signal generator continues to move in the direction of the vehicle, said mobile identification signal generator will enter the second zone AB2 of the approach range ANB. In the second zone AB2 (after a predetermined time interval has passed), a position measurement on the part of the vehicle or by means of the evaluation device STE thereof takes place in turn, and as a result at the time (2) the position P2 shown in FIG. 2 (cf. the position POS2 in FIG. 1) is determined, and in turn the corresponding instantaneous speed of movement of the identification signal generator and the direction of movement of the identification signal generator at the position P2 are determined on the basis of the relation to the position P1. At the time (2) it is then possible to estimate a position with respect to the time (2) (characterized by the rhombus characterized by GP2) which would be expected at a subsequent measuring point which is in the future in relation to the time (2) if the identification signal generator were to follow a direction of movement in a straight line in the direction from the position P1 to the position P2. As is shown in FIG. 2, this position GP2 which is estimated at the time (2) is within the access range AB3. This determination of the estimated (future) positions is carried out, as already mentioned, by the evaluation device STE, and consequently at the time (2) or at the position P2 the evaluation device STE detects that the estimated position GP2 at the time (2) is in the access range, and it therefore detects that the unlocking condition applies. On the basis of this locking condition, said evaluation device STE can then output an unlocking signal ES or else also an opening signal OS to the door lock TS for unlocking or for opening the door. In other words, the unlocking of the vehicle or of a door can already be carried out without the identification signal generator itself already being located in the access range AB3, but is merely expected there at the next position measuring point, with the result that such a method provides prompt reaction when the vehicle is unlocked.

For the sake of completeness, it will also be shown here that also at a third time (3) it would in turn also be possible to detect at the position P3 that the position estimated at this time (3) would also in turn be in the access range.

If the vehicle is unlocked, a light control signal SS according to this can, for example, be output by the evaluation device in order to inform the driver thereof, for example by brief flashing by means of the lighting device BL.

Reference will now be made to FIG. 3 in which a second schematic illustration of a process of a mobile identification signal generator approaching a vehicle FZ is shown. For reasons of clearer illustration, no other zones (as in FIG. 2) are illustrated here apart from the access range or the third zone AB3. While FIG. 2 illustrated a process of a mobile identification signal generator approaching at a high speed, i.e. the mobile identification signal generator respectively traveled a large distance between the individual positions or measuring points, FIG. 3 illustrates the case in which a mobile identification signal generator approaches the vehicle at a low speed at least during the first four measuring points. This means that a mobile identification signal generator moves starting from a position P0 at the time (0) at only a low speed in the direction of the vehicle FZ, and the distance from the next measuring point P1 at the time (1) is therefore small. Assuming that the time intervals in FIG. 2 and FIG. 3 for the measurement of a position are of equal length, a (relatively) small value is therefore obtained for the speed of movement (characterized by the length of a speed arrow) of the mobile identification signal generator in FIG. 3 compared to FIG. 2. Consequently, the position GP1, estimated at the time (1), of the mobile identification signal generator which is to be expected when the position is measured next will not be far from position P1. It is similar with the position GP2, estimated at the time (2), and the position GP3, estimated at the time (3), of the mobile identification signal generator. None of the estimated positions GP1, GP2 and GP3 are located within the access range AB3 owing to the low speed of movement of the identification signal generator, and the evaluation device STE of the vehicle therefore cannot detect an unlocking condition at any time, and correspondingly cannot send an unlocking signal or opening signal to the door lock TS either.

As already mentioned above, the position of the mobile identification signal generator can be measured at specific time intervals, in particular at regular time intervals, as is already carried out at time intervals of 250 ms, by virtue of the fact that interrogation signals ANS with a predetermined field strength I0 are emitted via the transceiver device SE or the antenna ANF. The purpose of the emission of the interrogation signals ANS with a predetermined field strength is that a mobile identification signal generator IDG which is located in particular in the approach range ANB measures the field strength or intensity of the interrogation signals at its current location and transmits back to the vehicle the, for example, digitized intensity value or RSSI (received signal strength indication) value. An RSSI value which is received via the antenna ANF and the vehicle-side transceiver device SE is finally fed to the control device STE so that the latter determines the distance of the identification signal generator IDG from the vehicle in the function of an evaluation device on the basis of the known field strength I0, with which the interrogation signals are emitted, and on the basis of the intensity values I, measured by the identification signal generator IDG, of the interrogation signals at the current location of the identification signal generator IDG. As already mentioned, this can take place at time intervals of approximately 250 ms, and as a result a movement of the mobile identification signal generator can be detected on the basis of a sensed change in intensity over time. It must merely be noted that the position measurement or localization can also take place in other ways, for example optically by means of a camera which senses the movement of the person who is carrying the identification signal generator with them. In addition it is possible for the identification signal generator itself to be able to determine its position and also its speed of movement relative to the vehicle on the basis of a multiplicity of vehicle-side interrogation signals (with predetermined signal levels), and for it to then transmit this position back to the vehicle within the scope of a response signal.

While for the sake of clarity only one antenna ANF is shown in FIG. 1, it is also conceivable to provide two or more antennas at different locations on the vehicle in order to be able to perform more detailed determination of position or determination of position with improved local resolution of an identification signal generator IDG by transmitting respective interrogation signals and receiving corresponding response signals. By means of at least two vehicle-side antennas it is therefore possible, for example, to specify a location of the mobile identification signal generator in Cartesian coordinates x and y.

In this regard, a speed of the mobile identification signal generator can be specified in the direction x with respect to the sampling point or time t:

$$vx(t)=(x(t)-x(t-dt))/dt.$$

Correspondingly, a speed of the mobile identification signal generator can be specified in the direction y with respect to the sampling point or time t:

$$vy(t)=(y(t)-y(t-dt))/dt.$$

As a result, the following is obtained for an estimated position in relation to the x axis for a subsequent sampling point:

$$x(t+1)=x(t)+vx(t)*dt,$$

and correspondingly the estimated position on the y axis for the subsequent sampling point is obtained as:

$$y(t+1)=y(t)+vy(t)*dt.$$

Reference will now be made to FIG. 4 in which once more the possible unlocking strategies and locking strategies are shown as a function of the direction of movement of a mobile identification signal generator. Here, the identification signal generator which is characterized as ID2 represents the case in which, as is, for example, also described in FIG. 2, the identification signal generator ID2 is approaching in the direction of the vehicle FZ, and as a result, it corresponds to FIG. 2, before the identification signal generator enters the access range AB3 a door of the vehicle is unlocked if an estimated position for the next time is already in the access range AB3.

The identification signal generator ID1 characterizes the case in which an identification signal generator ID1 is moving from outside the access range AB3 in the direction of the access range (where it is in fact also illustrated in FIG. 4), but its direction of movement is not in the direction of the vehicle FZ but rather essentially parallel to the vehicle FZ. Here, it would also be possible to assume the case in which the identification signal generator ID1 moves into the access range AB3, in which case its direction of movement even points away from the vehicle. The evaluation device STE in the vehicle FZ, which evaluation device STE tracks the movement of the identification signal generator ID1 over a plurality of measuring points, detects that although the identification signal generator ID1 will penetrate (and actually penetrates) the access range AB3 owing to the direction of movement of said identification signal generator ID1, but is not moving in the direction of the vehicle, in contrast to the identification signal generator ID2. Owing to this, the evaluation device STE will detect, owing to the detected direction of movement (parallel to the vehicle or away from the vehicle), an unlocking veto condition and therefore prevents the actual outputting of the unlocking signal or opening signal to the door lock TS. This refinement of the method is intended to prevent a vehicle unintentionally being unlocked if the driver or operator is merely going past the vehicle without having the intention of entering the vehicle. This refinement therefore increases the security of the access system.

Finally, reference will also be made to the identification signal generator ID3 in which it is assumed that the driver or operator with the identification signal generator ID3 would like to move away from the vehicle. In this context, the identification signal generator ID3 is firstly located in the access range AB3 (as illustrated in FIG. 4), and moves out of this access range. In a way which is analogous to the identification signal generator ID2 in which entry into the access range AB3 can be estimated, it is also possible in the case of the identification signal generator ID to estimate exiting from the access range AB3 on the basis of the current position, the current speed of movement and the current direction of movement for a subsequent position measuring time. If this estimated position point of the identification signal generator ID3 is outside the access range, the evaluation device STE of the vehicle will transmit a corresponding locking signal or closing signal to the door lock TS. This also means here again that the quicker the identification signal generator ID3 moves away from the vehicle, the greater the distance of an estimated position from a measured position at the time (X) is, and the faster the estimated position will come to lie outside the access range AB3, so that locking of the vehicle can already take place at an early time.

The access arrangement according to various embodiments is therefore based on the core idea of both using the instantaneous position of the identification signal generator and the instantaneous speed and direction of movement for estimating the position at a next measurement position. In this way it is possible, for example, to prevent the unlocking of the vehicle FZ when the identification signal generator is moving approximately parallel to the vehicle or away from the vehicle (cf. the case shown with respect to the identification signal generator ID1). However, the unlocking can also be enabled if the user stands next to the vehicle door. If the user is moving directly toward the vehicle (in the case shown with respect to the identification signal generator ID2) the vehicle is unlocked in all cases. The unlocking can be carried out even if the user is not yet located in the unlocking zone or the access range but is moving toward the vehicle at an increased speed (cf. for example the explanation above relating to FIG. 2). Correspondingly, it is also possible to bring about unlocking of the vehicle if the driver with the identification signal generator is still located in the access range (cf. the case shown with respect to the identification signal generator ID3) but is moving away from the vehicle at an increased speed. It is therefore possible to improve the reaction time of the access arrangement by means of the methods described above.

In particular in order to supplement the case shown with respect to the identification signal generator ID1, in which the identification signal generator is not moving directly toward the vehicle but, for example, moves parallel to the vehicle, the following method can also be efficiently used for unlocking the vehicle. The position of the mobile identification signal generator relative to the vehicle is sensed (in particular at predetermined time intervals as is also explained with respect to FIGS. 2 and 3). In addition, the speed of movement of the mobile identification signal generator relative to the vehicle is determined (for example on the basis of the change in position within a time interval, as explained above). And finally the at least one door of the vehicle is unlocked if the mobile identification signal generator is located at a predetermined range (such as the access range AB3) and the speed of movement of the mobile identification signal generator relative to the vehicle within the predetermined range is lower than a predetermined speed threshold value. This means that here the evaluation device of the vehicle detects that although the identification signal generator is not moving directly toward the vehicle, but owing to a specific low speed there is a high probability that the driver who is carrying the identification signal generator would like to gain access to the vehicle. This also in turn increases the convenience for the driver.

What is claimed is:

1. A method for controlling at least one door of a vehicle, having the following steps:
    sensing a position of a mobile identification signal generator, assigned to the vehicle, relative to the vehicle at multiple different points in time;
    comparing the sensed position of the mobile identification signal generator at two or more different points in time to calculate (a) a current direction of movement and (b) a current speed of movement of the mobile identification signal generator at a current time,
    calculating a future position of the mobile identification signal generator at a predetermined future time relative to the current time based at least on the calculated speed of movement and the calculated direction of movement of the mobile identification signal generator at the current time;
    comparing the calculated future position of the mobile identification signal generator with a predetermined range relative to the vehicle,
    determining a door status activation condition if the future position of the mobile identification signal generator is within the predetermined range; and
    automatically changing at least one of a door locked status and a door open status of the at least one door in response to the determined door status activation condition.

2. The method according to claim 1, in which authentication of the mobile identification signal generator is carried out at the vehicle in order to check the association of the mobile identification signal generator with the vehicle.

3. The method according to claim 1, in which the position of the mobile identification signal generator is measured at predetermined time intervals.

4. The method according to claim 1, in which the speed of movement of the mobile identification signal generator at the current time is determined on the basis of the change in the position of the mobile identification signal generator at a preceding time with respect to the position of the mobile identification signal generator at the current time in the time interval from the preceding time to the current time, and the current direction of movement is determined as a direction from the position of the mobile identification signal generator at a preceding time with respect to the position of the mobile identification signal generator at the current time.

5. The method according to claim 1, wherein:
    determining the door status activation condition comprises determining an unlocking condition; and
    automatically changing at least one of a door locked status and a door open status of the at least one door in response to the determined door status activation condition comprises at least one of unlocking and opening the at least one door in response to determining the unlocking condition.

6. The method according to claim 1, wherein:
    determining the door status activation condition comprises determining a locking condition; and
    automatically changing at least one of a door locked status and a door open status of the at least one door in response to the determined door status activation condition comprises at least one of locking and closing the at least one door in response to determining the locking condition.

7. The method according to claim 5, wherein an unlocking veto condition is detected if the direction of movement of the mobile identification signal generator at the current time is not in the direction of the vehicle, with the result that when the unlocking veto condition applies, the at least one door is not at least one of unlocked and opened.

8. The method according to claim 7, in which the unlocking veto condition is rescinded if the identification signal generator is located within the predetermined range and its speed of movement is lower than a predetermined speed threshold value.

9. A method for unlocking a vehicle having the following steps:
    sensing a position of a mobile identification signal generator relative to the vehicle at multiple different points in time;
    comparing the sensed position of the mobile identification signal generator at two or more different points in time to calculate a speed of movement of the mobile identification signal generator relative to the vehicle; and
    unlocking at least one door of the vehicle if the identification signal generator is located within a predetermined range and the calculated speed of movement of the mobile identification signal generator relative to the vehicle within the predetermined range is lower than a predetermined speed threshold value.

10. An access arrangement for a vehicle comprising:
    a vehicle-side movement sensing device for sensing a position of a mobile identification signal generator, assigned to the vehicle, relative to the vehicle at multiple different points in time; and
    an evaluation device configured:
        to compare the sensed position of the mobile identification signal generator at two or more different points in time to calculate (a) a current direction of movement and (b) a current speed of movement of the mobile identification signal generator at a current time,
        to calculate a future position of the mobile identification signal generator at a predetermined future time relative to the current time based at least on the calculated speed of movement and the calculated direction of movement of the mobile identification signal generator at the current time,
        to compare the calculated future position of the mobile identification signal generator with a predetermined range relative to the vehicle,
        to determine a door status activation condition if the future position of the mobile identification signal generator is within the predetermined range; and
        to output a signal to change at least one of a door locked status and a door open status of the at least one door in response to the determined door status activation condition.

11. The access arrangement according to claim 10, in which the movement sensing device comprises a vehicle-side transceiver device which, in order to sense the movement of the mobile identification signal generator, is configured:
    to emit a multiplicity of interrogation signals with a predetermined intensity at predetermined time intervals, and to receive a response signal, assigned to an interrogation signal, from the mobile identification signal generator, which respond signal contains information relating to the intensity of the interrogation signal which is measured at the location of the mobile identification signal generator.

12. The access arrangement according to claim 10, which also has a vehicle-side transceiver device for carrying out authentication with a mobile identification signal generator.

13. The access arrangement according to claim 10, wherein:
  determining the door status activation condition comprises determining an unlocking condition; and
  outputting a signal to change at least one of a door locked status and a door open status of the at least one door in response to the determined door status activation condition comprises outputting at least one of a signal to unlock the at least one door and a signal to open the at least one door in response to determining the unlocking condition.

14. The access arrangement according to claim 10, wherein:
  determining the door status activation condition comprises determining a locking condition; and
  outputting a signal to change at least one of a door locked status and a door open status of the at least one door in response to the determined door status activation condition comprises outputting at least one of a signal to lock the at least one door and a signal to close the at least one door in response to determining the locking condition.

15. The access arrangement according to claim 13, in which the evaluation device is also configured to detect an unlocking veto condition if the direction of movement at the current time is not in the direction of the vehicle, and not to output a signal if the unlocking veto condition applies.

* * * * *